(12) United States Patent
Yang

(10) Patent No.: US 11,754,956 B2
(45) Date of Patent: Sep. 12, 2023

(54) MEDIUM THICKNESS DETECTION MECHANISM

(71) Applicant: Foxlink Image Technology Co., Ltd., New Taipei (TW)

(72) Inventor: Chih Yuan Yang, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 281 days.

(21) Appl. No.: 17/391,847

(22) Filed: Aug. 2, 2021

(65) Prior Publication Data
US 2022/0326647 A1    Oct. 13, 2022

(30) Foreign Application Priority Data

Apr. 8, 2021   (CN) .......................... 202120710681.6

(51) Int. Cl.
   *G03G 15/00*     (2006.01)
   *G01B 21/08*     (2006.01)
   *G01B 7/06*      (2006.01)

(52) U.S. Cl.
   CPC ........... *G03G 15/5029* (2013.01); *G01B 7/06* (2013.01); *G01B 21/08* (2013.01); *G03G 2215/00738* (2013.01)

(58) Field of Classification Search
   CPC ..... G03G 15/5029; G03G 2215/00738; G01B 7/06; G01B 21/08
   See application file for complete search history.

(56) References Cited

U.S. PATENT DOCUMENTS

| | | | | |
|---|---|---|---|---|
| 5,743,521 | A | * | 4/1998 | Munakata .......... G03G 15/5029 271/265.04 |
| 2008/0001348 | A1 | * | 1/2008 | Kawasaki ............ B41J 11/0095 271/259 |
| 2009/0244566 | A1 | * | 10/2009 | Jackson ............... G03G 15/167 358/1.9 |

* cited by examiner

*Primary Examiner* — Joseph S Wong
(74) *Attorney, Agent, or Firm* — LIN & ASSOCIATES INTELLECTUAL PROPERTY, INC.

(57) ABSTRACT

A thickness detection mechanism arranged in a scanner or printer for measuring the thickness of mediums fed through the scanner or printer, which comprising: a conveyor section; at least a idle roller set arranged above the conveyor section, which includes at least a shaft and an idle roller pivotally arranged on the shaft; at least an elastic portion arranged above the shaft; and at least a pressure sensor secured on the elastic portion; wherein the thickness detection mechanism measures the thickness of the medium by measuring the pressure applied on the pressure sensor by the idle roller set as the idle roller set being pushed upward, and thus avoids the medium too thin or too thick to enter the scanner or the printer.

11 Claims, 3 Drawing Sheets

Figure 1:
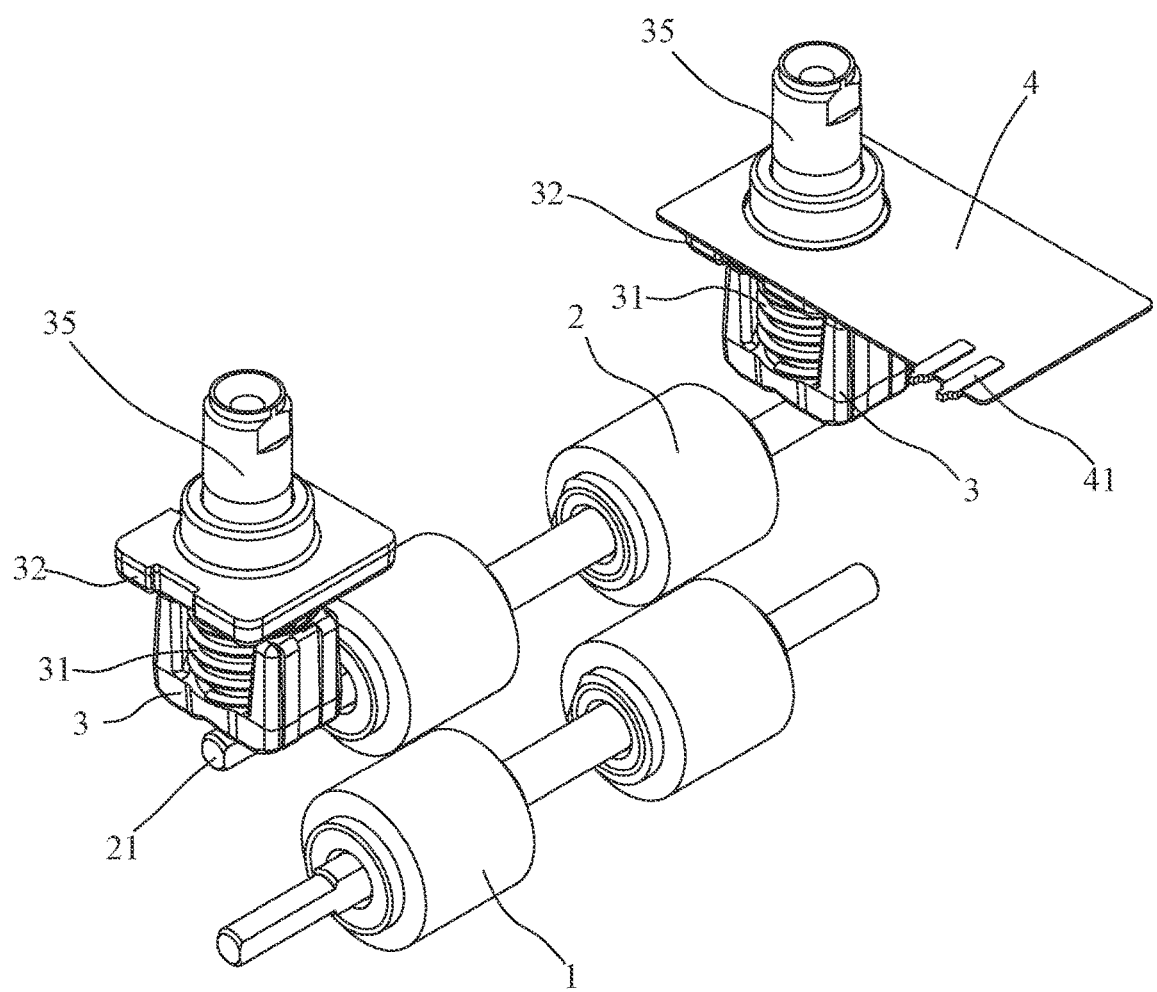
Figure 2:
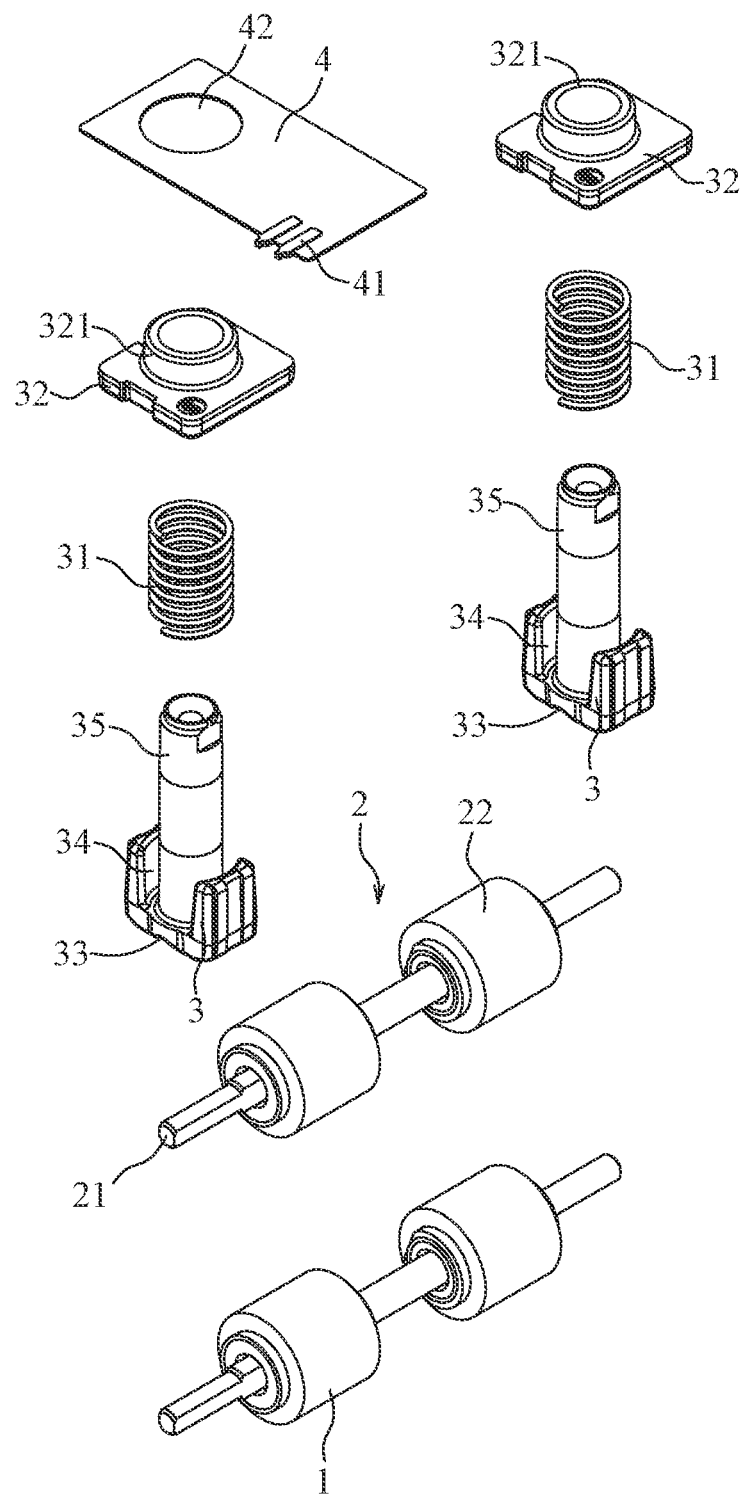
Figure 3:
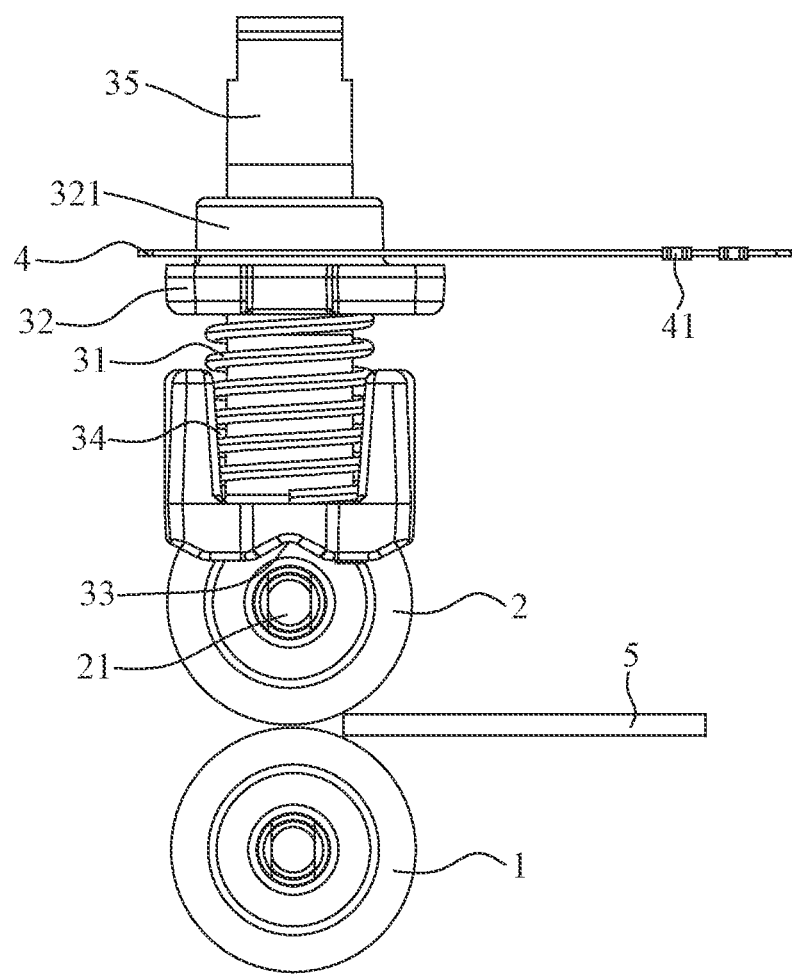

MEDIUM THICKNESS DETECTION MECHANISM

CROSS-REFERENCE TO RELATED APPLICATION

The present application is based on, and claims priority from, China Patent Application No. 202120710681.6, filed Apr. 8, 2021, the disclosure of which is hereby incorporated by reference herein in its entirety.

BACKGROUND OF THE INVENTION

1. Field of the Invention

The present invention relates to a medium thickness detection mechanism, in particular to a medium thickness detection mechanism of an automatic document feeder.

2. The Related Art

The conventional scanners and printers cannot detect the thickness of mediums fed through by an automatic document feeder, and it may result in the poor scan or the poor print quality when the user put a medium which is too thin. Moreover, when the automatic document feeder cannot convey the thin medium, the thin medium may be damaged by the automatic document feeder and components of the scanners or printers.

In other hand, if the user put a medium which is too thick, it may result in the poor scan or the poor print quality, and the medium being stuck in the scanner and causing damage to the scanner.

Therefore, it is necessary to provide a thickness detection mechanism which detects the thickness of objects to ensure the scanner and the printer to scan or to print on the medium with proper thickness, and thus avoiding the poor scan or the poor print quality and damaging the scanner.

SUMMARY OF THE INVENTION

The objective of the present invention is to provide a thickness detection mechanism which detects the thickness of objects.

A medium thickness detection mechanism arranged in an automatic document feeder, comprising: a conveyor assembly; at least an idle roller assembly arranged above the conveyor assembly, which has at least a shaft and an idle roller pivotally arranged on the shaft; at least an elastic assembly arranged above the shaft, the elastic assembly having a base arranged above the shaft; a securing portion extended from a top of the base and extended upward, a elastomer sleeved on the securing portion, a pressing rod connected to the securing portion and arranged above the elastomer; and at least a pressure sensor secured on the pressing rod of the elastic assembly.

In a preferred embodiment, wherein the conveyor assembly has at least a roller.

In a preferred embodiment, wherein the elastomer is a coil spring.

In a preferred embodiment, wherein the pressure sensor is fixed to the pressing rod with adhesive.

In a preferred embodiment, wherein a recess is formed at a bottom of the base of elastic assembly for fitting the shaft.

In a preferred embodiment, wherein securing portion is extended from a middle of the top surface of the base, a peripheral wall is extended upward from a peripheral portion of the top surface of the base, the peripheral wall and the securing portion are separated by a holding groove, the elastomer is sleeved on a bottom of the securing portion, the elastomer is positioned in the holding groove.

In a preferred embodiment, wherein the pressing rod has a limiting portion and a pressing plate, the limiting portion is extended upward from a top surface of the pressing plate, the limiting portion is a hollow cylinder, a middle of the limiting portion penetrates the pressing plate and surrounds the securing portion.

In a preferred embodiment, wherein the pressing rod is sleeved on a middle of the securing portion and positioned on the elastomer, a bottom of the elastomer abuts against the top surface of the base, a top of the elastomer 31 abuts against a bottom surface of the pressing plate.

In a preferred embodiment, wherein the pressure sensor has an opening to accommodate the limiting portion.

In a preferred embodiment, wherein the base is formed as a flat plate.

In a preferred embodiment, wherein securing portion is formed as a pillar.

BRIEF DESCRIPTION OF THE DRAWINGS

The present invention will be apparent to those skilled in the art by reading the following description, with reference to the attached drawings, in which:

FIG. 1 is a perspective view of a medium thickness detection mechanism of the present invention.

FIG. 2 is an exploded view of the medium thickness detection mechanism of the present invention.

FIG. 3 is a side view of the medium thickness detection mechanism of the present invention.

DETAILED DESCRIPTION OF THE PREFERRED EMBODIMENT

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Referring to FIG. 1 to FIG. 3, a medium thickness detection mechanism 100 of the present invention is arranged in an automatic document feeder of a scanner or a printer. The medium thickness detection mechanism 100 includes a conveyor assembly 1, at least an idle roller assembly 2, at least an elastic assembly 3 and at least a pressure sensor 4.

The conveyor assembly 1 includes at least a roller. The idle roller assembly 2 is arranged above the conveyor assembly 1 and includes at least a shaft 21 and an idle roller 22 pivotally arranged on the shaft 21. The elastic assembly 3 is arranged above the shaft 21 and includes an elastomer 31 and a pressing rod 32 arranged above the elastomer 31. The pressure sensor 4 is secured on the pressing rod 31. The pressure sensor 4 includes two pins 41.

The two pins 41 of the pressure sensor 4 are connected to other electric device (not shown) which can detects the electricity resistance value of the pressure sensor 4, and the electricity resistance value of the pressure sensor 4 varies with a pressure of the pressing rod 31 pressing on the pressure sensor 4. When the electricity resistance of the pressure sensor 4 is gradually reduced, the pressure on the pressure sensor 4 is gradually increased. So the electric device connected to the pressure sensor 4 can measure the pressure on the pressure sensor 4 by measuring electricity resistance.

The elastic assembly 3 includes a link bar 36, the elastomer 31 and the pressing rod 32. The elastomer 31 sleeves around a middle of the link bar 36. The pressing rod 32 sleeves around a top of the link bar 36. The elastomer 31 is positioned between the link bar 36 and the pressing rod 32. The link bar 36 includes a recess 33, a holding groove 34, a securing portion 35, a base 37 and a peripheral wall 38. The base 37 is formed as a flat plate. The recess 33 is formed on a middle of a bottom surface of the base 37. The recess 33 is positioned above the shaft 21, so the shaft 21 fits in the recess 33 when the shaft 21 is moved upward. Thus the elastic assembly 3 applies a pressure on the pressure sensor 4 through the pressing rod 32 when the elastic assembly 3 is lifted by the shaft 21. The shaft 21 is fixed in the recess 33 to ensure that the shaft 21 contacts a fixed point of the elastic assembly 3 to keep the pressure applied to the pressure sensor 4 in a fixed angle and direction. Thus the measuring result of the electricity resistance of the pressure sensor 4 is accurate.

The securing portion 35 is extended upward from a middle of a top surface of the base 37. The securing portion 35 is formed as a pillar. The peripheral wall 38 is extended upward from a peripheral portion of the top surface of the base 37. The peripheral wall 38 and the securing portion 35 are separated by the holding groove 34. The holding groove 34 is formed between the securing portion 35 and the peripheral wall 38. The elastomer 31 is sleeved on a bottom of the securing portion 35, and the elastomer 31 is a coil spring in this embodiment. The elastomer 31 is positioned in the holding groove 34. The pressing rod 32 is sleeved on a middle of the securing portion 35 and positioned on the elastomer 31. A bottom of the elastomer 31 abuts against the top surface of the base 37, a top of the elastomer 31 abuts against the pressing rod 32. The pressing rod 32 includes a limiting portion 321 and a pressing plate 322. The limiting portion 321 is a hollow cylinder. A middle of the pressing rod 32 penetrates the pressing plate 322. The limiting portion 321 is extended upward from a top surface of the pressing plate 322 and arranged to surround the middle of the securing portion 35. The top of the elastomer 31 abuts against a bottom surface of the pressing plate 322. The pressure sensor 4 includes an opening 42 configured to accommodate the limiting portion 321 for securing the pressure sensor 4 on the pressing rod 32.

The operating process of the medium thickness detection mechanism 100 is described as follow: when the user puts a medium 5 (e.g., a paper or a card) in-between the conveyor assembly 1 and the idle roller assembly 2, the thickness of the medium 5 lifts the idle roller 22 upward and thus pushes the shaft 21 into the recess 33. Thus the elastic assembly 3 is lifted upward, and then the elastomer 31 of the elastic assembly 3 is compressed upward to lift the pressing rod 32. The lifted pressing rod 32 increases the pressure on the pressure sensor 4, and thus decreases the electricity resistance of the pressure sensor 4. Different thickness of the medium 5 causes different amount of change of electricity resistance, so the thickness of the medium 5 can be measure by measuring the electricity resistance of the pressure sensor 4. In some embodiments, an acceptable range of electricity resistance value is predefined to control the thickness of mediums 5. If the electricity resistance of the pressure sensor 4 is too big or too small, the scanner or the printer will abandon the process to avoid the medium 5 with too thin thickness or too thick thickness entering the scanner or the printer.

When the medium 5 is too thin, the displacement of the idle roller 22 will be also very small or even unmoved, so the change of pressure on the pressure sensor 4 will also be very small or not changed. Therefore, the decreased electricity resistance value of the pressure sensor 4 is still larger than the predefined acceptable range, so the scanner or the printer will abandon the process to avoid the medium 5 with too thin thickness to enter the scanner or the printer. When the medium 5 is too thick, the displacement of the idle roller 21 will be much larger, so the change of pressure on the pressure sensor 4 will also be big. Therefore, the decreased electricity resistance value of the pressure sensor 4 is lesser than the predefined acceptable range, so the scanner or the printer will abandon the process to avoid the medium 5 too thick to enter the scanner or the printer.

In other embodiment, the pressure sensor 4 is fixed on the pressing rod 32 (e.g., by adhesive, etc.), so that the pressure sensor 4 can measure the pressure more accurate.

In summary, when a user puts a medium 5 such as a paper or a card into the scanner or the printer, the medium thickness detection mechanism 100 can determine the thickness of the medium 5 by measuring the pressure which is applied by the idle roller assembly 2 on the pressure sensor 4, so that the medium 5 which is too thin or too thick can be prevented from entering the scanner or the printer. This prevents the scanner or the printer from being subjected to too thin or too thick medium 5 which may affect the scanning quality and damage the scanner or the printer.

What is claimed is:

1. A medium thickness detection mechanism arranged in an automatic document feeder, comprising:
    a conveyor assembly;
    at least an idle roller assembly arranged above the conveyor assembly, which has at least a shaft and an idle roller pivotally arranged on the shaft;
    at least an elastic assembly arranged above the shaft, the elastic assembly having
        a base arranged above the shaft;
        a securing portion extended from a top of the base and extended upward,
        a elastomer sleeved on the securing portion,
        a pressing rod connected to the securing portion and arranged above the elastomer; and
    at least a pressure sensor secured on the pressing rod of the elastic assembly.

2. The medium thickness detection mechanism as claimed in claim 1, wherein the conveyor assembly has at least a roller.

3. The medium thickness detection mechanism as claimed in claim 1, wherein the elastomer is a coil spring.

4. The medium thickness detection mechanism as claimed in claim 1, wherein the pressure sensor is fixed to the pressing rod with adhesive.

5. The medium thickness detection mechanism as claimed in claim 1, wherein a recess is formed at a bottom of the base of elastic assembly for fitting the shaft.

6. The medium thickness detection mechanism as claimed in claim 1, wherein securing portion is extended from a middle of the top surface of the base, a peripheral wall is extended upward from a peripheral portion of the top surface of the base, the peripheral wall and the securing portion are separated by a holding groove, the elastomer is sleeved on a bottom of the securing portion, the elastomer is positioned in the holding groove.

7. The medium thickness detection mechanism as claimed in claim 1, wherein the pressing rod has a limiting portion and a pressing plate, the limiting portion is extended upward from a top surface of the pressing plate, the limiting portion is a hollow cylinder, a middle of the limiting portion penetrates the pressing plate and surrounds the securing portion.

8. The medium thickness detection mechanism as claimed in claim 7, wherein the pressing rod is sleeved on a middle of the securing portion and positioned on the elastomer, a bottom of the elastomer abuts against the top surface of the base, a top of the elastomer abuts against a bottom surface of the pressing plate.

9. The medium thickness detection mechanism as claimed in claim 7, wherein the pressure sensor has an opening to accommodate the limiting portion.

10. The medium thickness detection mechanism as claimed in claim 7, wherein the base is formed as a flat plate.

11. The medium thickness detection mechanism as claimed in claim 7, wherein securing portion is formed as a pillar.

\* \* \* \* \*